(12) United States Patent
Hegde (10) Patent No.: US 12,437,053 B2
(45) Date of Patent: Oct. 7, 2025

(54) INTERACTION REQUEST SYSTEM AND METHOD

(71) Applicant: Visa International Service Association, San Francisco, CA (US)

(72) Inventor: Vilas Hegde, San Francisco, CA (US)

(73) Assignee: VISA INTERNATIONAL SERVICE, San Francisco, CA (US)

( * ) Notice: Subject to any disclaimer, the term of this patent is extended or adjusted under 35 U.S.C. 154(b) by 0 days.

(21) Appl. No.: 18/261,661

(22) PCT Filed: Jan. 19, 2021

(86) PCT No.: PCT/US2021/014005
§ 371 (c)(1),
(2) Date: Jul. 14, 2023

(87) PCT Pub. No.: WO2022/159083
PCT Pub. Date: Jul. 28, 2022

(65) Prior Publication Data
US 2024/0265085 A1 Aug. 8, 2024

(51) Int. Cl.
*G06F 21/00* (2013.01)
*G06F 21/44* (2013.01)

(52) U.S. Cl.
CPC .................................... *G06F 21/44* (2013.01)

(58) Field of Classification Search
CPC ...................................................... G06F 21/44
See application file for complete search history.

(56) References Cited

U.S. PATENT DOCUMENTS

| 2012/0239417 A1 | 9/2012 | Pourfallah et al. |
| 2013/0110607 A1* | 5/2013 | Basmajian ......... G06Q 30/0234 |
| | | 705/14.26 |

(Continued)

FOREIGN PATENT DOCUMENTS

| CN | 111819825 A | 10/2020 |
| CN | 111886618 A | 11/2020 |

(Continued)

OTHER PUBLICATIONS

International Preliminary Report on Patentability for International Patent Application No. PCT/US2021/014005, dated Jul. 20, 2023, 5 pages.

(Continued)

*Primary Examiner* — Rodman Alexander Mahmoudi
(74) *Attorney, Agent, or Firm* — Kilpatrick Townsend & Stockton LLP (57) ABSTRACT

Techniques for processing an interaction using an interaction request include receiving, by an authorization computer from a transport computer, a request for a value, transmitting, by the authorization computer, the request for the value to a user device for approval, transmitting, by the authorization computer to the transport computer, a message comprising an identifier for the request for the value, receiving, by the authorization computer from the user device, an indication of approval of the request for the value, responsive to receiving the indication of approval from the user device, determining, by the authorization computer, whether or not the value should be granted, and transmitting, by the authorization computer to the transport computer, an authorization code indicating whether or not the value is granted and the identifier for the request.

19 Claims, 6 Drawing Sheets

(56) References Cited

U.S. PATENT DOCUMENTS

| | | |
|---|---|---|
| 2014/0067571 A1 | 3/2014 | Fricke et al. |
| 2014/0223516 A1 | 8/2014 | Vongsouvanh et al. |
| 2016/0232527 A1 | 8/2016 | Patterson |
| 2018/0268183 A1* | 9/2018 | Vyas .................... G06K 7/1417 |
| 2019/0188696 A1* | 6/2019 | Carpenter ............. G06Q 20/36 |
| 2019/0318114 A1 | 10/2019 | Holt et al. |
| 2022/0198501 A1* | 6/2022 | Jones ................. G06Q 30/0217 |

FOREIGN PATENT DOCUMENTS

| | | | | |
|---|---|---|---|---|
| WO | WO-2013003372 A1 * | 1/2013 | ............ | G06Q 20/00 |
| WO | 2020081788 A1 | 4/2020 | | |

OTHER PUBLICATIONS

International Search Report and the Written Opinion dated Oct. 13, 2021 for International Patent Application No. PCT/US2021/014005, 9 pages.
Office Action, mailed Mar. 8, 2024, Chinese Application No. CN202180091149.3, 11 pages.
Extended European Search Report, mailed Feb. 6, 2024, EP Application No. EP21921546.4, 7 pages.
Notice of Decision to Grant, mailed Jul. 22, 2024, Chinese Patent Application No. CN202180091149.3, 7 pages.
Written Opinion, mailed Jun. 30, 2024, Singapore Patent Application No. SG11202305335T, 7 pages.
Notice of Decision to Grant, mailed Jul. 22, 2024, Chinese Application No. CN202180091149.3, 7 pages.
Written Opinion, mailed Jun. 30, 2024, Singapore Application No. SG11202305335T, 7 pages.

* cited by examiner

INTERACTION REQUEST SYSTEM AND METHOD

This application is a U.S. National Phase Application of International Patent Application No. PCT/US2021/014005, filed Jan. 19, 2021, the disclosure of which is herein incorporated by reference its entirety for all purposes.

BACKGROUND

Computer-implemented interactions commonly involve a series of messages between computing devices aimed to determine whether an entity has appropriate credentials to access a secure resource. For example, when an employee scans a key card at a secure location, the scanning device may transmit a request to a central computer that validates the employee's credentials. As another example, when a customer scans a credit card at a store terminal, the terminal will typically prepare and send request messages to verify the identity and fund availability associated with the credit card.

Typically, such interactions rely on a structured set of requests and responses. This structure does not generally permit approvals or pauses in the interaction flow beyond those within the established structure.

Embodiments of the invention address this and other problems, both individually and collectively.

BRIEF SUMMARY

The present disclosure relates to are related to methods and systems for request-based interaction processing.

In some embodiments, computer-implemented method comprises receiving, by an authorization computer from a transport computer, a request for a value; transmitting, by the authorization computer, the request for the value to a user device for approval; transmitting, by the authorization computer to the transport computer, a message comprising an identifier for the request for the value; receiving, by the authorization computer from the user device, an indication of approval of the request for the value; responsive to receiving the indication of approval from the user device, determining, by the authorization computer, whether or not the value should be granted; and transmitting, by the authorization computer to the transport computer, an authorization code indicating whether or not the value is granted and the identifier for the request for the value.

In some aspects, the message comprising the identifier for the request for the value is transmitted to the transport computer asynchronously. In some aspects, the request for the value comprises a primary account number associated with a payment card. In some aspects, receiving the request for the value comprises receiving the request for the value from a processor server computer which forwards the request for the value from the transport computer.

In some aspects, transmitting the authorization code and the identifier for the request for the value to the transport computer comprises transmitting the authorization code to the processor server computer which forwards the authorization code and the identifier for the request for the value to the transport computer. In some aspects, the processor server computer identifies the transport computer for receiving the authorization code using the identifier for the request for the value. In some aspects, the request for the value is an International Organization for Standardization (ISO) message.

In some embodiments, an authorization computer comprises a memory; a processor; and a non-transitory computer-readable medium comprising instructions, which, when executed by the processor, perform the steps of: receiving, from a transport computer, a request for a value; transmitting the request for the value to a user device for approval; transmitting, to the transport computer, a message comprising an identifier for the request for the value; receiving, from the user device, an indication of approval of the request for the value; and responsive to receiving the indication of approval from the user device, transmitting, by to the transport computer, an authorization code indicating whether or not the value is granted and the identifier for the request for the value.

In some embodiments, a computer-implemented method comprises receiving, by a transport computer from a resource provider computer, a request for a value; transmitting, by the transport computer, the request for the value to an authorization computer; receiving, by the transport computer from the authorization computer, a message comprising an identifier for the request for the value; subsequent to receiving the identifier for the request for the value, receiving, by the transport computer from the authorization computer, an authorization code indicating whether or not the value is granted and the identifier for the request for the value; and transmitting, by the transport computer to the resource provider computer, a message indicating whether or not the value is granted.

In some aspects, the message comprising the identifier for the request for the value is received by the transport computer asynchronously. In some aspects, the request for the value comprises a primary account number associated with a payment card. In some aspects, the method further includes transmitting, by the transport computer to the authorization computer, a response message acknowledging receipt of the authorization code. In some aspects, transmitting the request for the value comprises transmitting the request for the value to a processor server computer which forwards the request for the value to the authorization computer.

In some aspects, receiving the authorization code and the identifier for the request for the value from the authorization computer comprises receiving the authorization code from the processor server computer which forwards the authorization code and the identifier for the request for the value to the transport computer after receiving the authorization code and the identifier for the request for the value from the authorization computer, wherein the processor server computer identifies the transport computer for receiving the authorization code using the identifier for the request for the value. In some aspects, the request for the value is an International Organization for Standardization (ISO) message.

In some embodiments, transport computer comprises a memory; a processor; a non-transitory computer-readable medium comprising instructions, which, when executed by the processor, perform the steps of: receiving, from a resource provider computer, a request for a value; transmitting the request for the value to an authorization computer; receiving, from the authorization computer, a message comprising an identifier for the request for the value; subsequent to receiving the identifier for the request for the value, asynchronously receiving, from the authorization computer, an authorization code indicating whether or not the value is granted and the identifier for the request for the value; and transmitting, to the resource provider computer, a message indicating whether or not the value is granted.

In some aspects, the request for the value comprises a primary account number associated with a payment card. In some embodiments, the steps further comprise transmitting, by the transport computer to the authorization computer, a response message acknowledging receipt of the authorization code. In some aspects, transmitting the request for the value comprises transmitting the request for the value to a processor server computer which forwards the request for the value to the authorization computer.

In some aspects, receiving the authorization code and the identifier for the request for the value from the authorization computer comprises receiving the authorization code from the processor server computer which forwards the authorization code and the identifier for the request for the value to the transport computer after receiving the authorization code and the identifier for the request from the authorization computer, wherein the processor server computer identifies the transport computer for receiving the authorization code using the identifier for the request for the value. In aspects, the request for the value is an International Organization for Standardization (ISO) message.

In some embodiments, a computer-implemented method comprises receiving, by a processor server computer from a transport computer, a request for a value; transmitting, by the processor server computer, the request for the value to an authorization computer; receiving, by the processor server computer from the authorization computer, a message comprising an identifier for the request for the value; transmitting, by the processor server computer to the transport computer, the message comprising the identifier for the request for the value; subsequent to receiving the identifier for the request for the value, receiving, by the processor server computer from the authorization computer, an authorization code indicating whether or not the value is granted and the identifier for the request for the value; and transmitting, by the processor server computer to the transport computer, the authorization code indicating whether or not the value is granted and the identifier for the request for the value.

In some aspects, the method further comprises, based on the identifier for the request for the value, identifying, by the processor server computer, the transport computer for receiving the authorization code.

DETAILED DESCRIPTION

Techniques for performing an interaction using an interaction request are described. In particular, an interaction request is used to allow a user to approve, decline, or defer an interaction before the interaction is processed. One example of such an interaction is a payment transaction using a credit card. Typically, for a recurring transaction, a user (e.g., a cardholder) will not have the opportunity to view or approve a pending transaction due to the traditional request/response process for processing payments. The techniques described herein use a request for a value, which may be processed using the credit card "rails" of International Organization for Standardization (ISO) messaging. An entity requests a value (e.g., from a transport computer associated with a merchant to an authorization computer associated with the user's bank). The request for the value is sent to a user. Meanwhile, the entity requesting the value is provided with a response indicating that the request for the value has been forwarded to the user, along with an identifier for the request for the value. The user may approve or deny the value request after some time. Upon receiving an indication of the user's approval or denial of the value request, the authorization computer determines whether the request for the value should be granted (e.g., by determining whether the account is in good standing). The authorization computer transits an authorization code indicating whether or not the value is granted and the identifier for the request for the value to the entity requesting the value. The value may then be granted to the requesting entity if approved.

Prior to discussing embodiments, description of some terms may be helpful in understanding aspects of the present disclosure.

A "user device" may be a device that includes one or more electronic components (e.g., an integrated chip) that can communicate with another device. A user device may provide remote communication capabilities to a network, and can be configured to transmit and receive data or communications to and from other devices. A user device may be in the form of a mobile device such as a mobile phone (e.g., smart phone, cellular phone, etc.), tablets, portable media player, personal digital assistant devices (PDAs), wearable computing device (e.g., watch), electronic reader device, etc., or in the form of a card (e.g., smart card) or a fob, etc. Examples of user devices may also include portable computing devices (e.g., laptop, netbook, ultrabook, etc.) or desktop devices (e.g., a personal computer). A user device may also be in the form of a vehicle (e.g., an automobile such as car) equipped with communication and/or network connectivity capabilities.

A "user" may include an individual that operates a user device to conduct an interaction such as a transaction on an account or otherwise manage an account. The user may also be referred to as a cardholder, accountholder, or consumer.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "authorization entity" may typically refer to a business entity (e.g., a bank) that maintains an account (e.g., a financial account) for a user. The account can be enrolled in an application installed on a user device of the user to allow the user to conduct transactions on the account via the communication device. An authorization entity may be associated with one or more "authorization computers."

A "resource provider" may typically be an entity that engages in transactions and can sell goods or services, or provide access to goods or services (e.g. a merchant). A resource provider may be associated with one or more "resource provider computers."

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may be associated with one or more "transport computers."

A "processing system" may include a network of one or more devices that can process and route transaction request messages. An example of a processing system may include data processing subsystems, networks, and operations used to support and deliver authorization services, exception file services, transaction scoring services, and clearing and settlement services. An example of a processing system is VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services. A processing system may operate one or more "processor server computers."

The term "value" generally refers to any asset of worth. For example, a value may be monetary funds. As another example, the value may be an electronic resource of value (e.g., stored data), a physical resource (e.g., a tangible object, a building, a safe, or a physical location), or other electronic communications between computers (e.g., a communication signal corresponding to an account for performing an interaction).

An "interaction" can be a reciprocal action, effect, or influence. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment. A an interaction may involve the exchange of monetary funds, or the exchange of goods or services for monetary funds between two individuals or entities.

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

An "account identifier" may include an original account identifier associated with a payment account. For example, an account identifier may be a primary account number (PAN) issued by an issuer for a card account (e.g., credit card, debit card, etc.). For instance, in some embodiments, an account identifier may include a sixteen digit numerical value such as "4147 0900 0000 1234." The first six digits of the account identifier (e.g., "414709") may represent an authorization entity identifier (BIN) that may identify an issuer associated with the account identifier.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Figure 1:
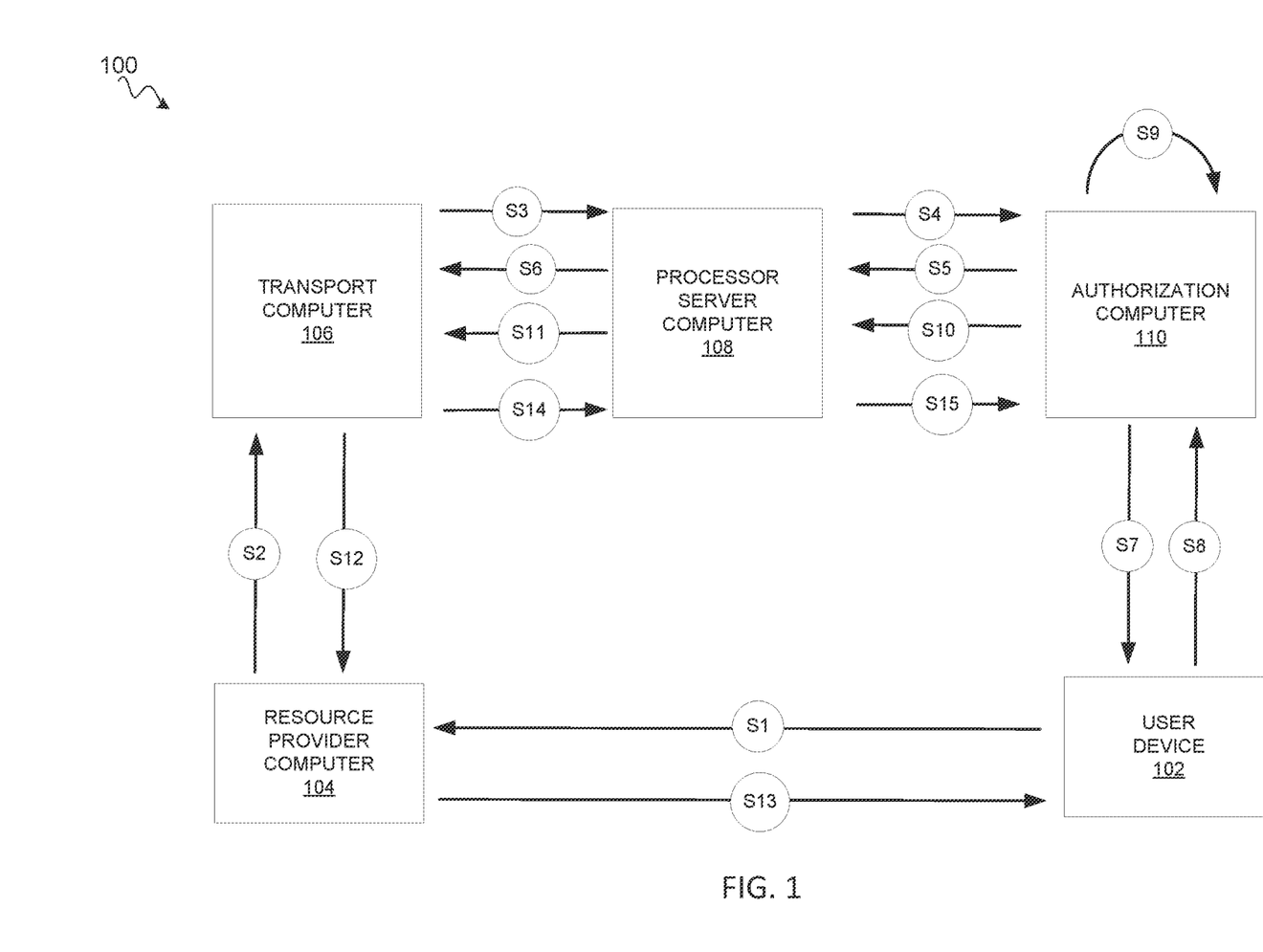
FIG. 1 illustrates an interaction request system, according to some embodiments.

FIG. 1 illustrates a schematic diagram of an interaction request method and system 100, according to some embodiments. The system may include a user device 102, a resource provider computer 104, a transport computer 106, a processor server computer 108, and an authorization computer 110. For simplicity of illustration, a limited number of components are shown in FIG. 1. It is understood, however, that embodiments may include more than one of each component.

The components in the system depicted in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like.

In some embodiments, the user device 102 is a device operable by a user and capable of executing applications. As examples, the user device 102 may be a smartphone, a computer, a tablet, or the like. The user device 102 may be configured to receive and manage interaction requests. The user device 102 may include hardware and/or software configured to store data. The user device 102 may include hardware and/or software configured to transmit data. The user device 102 may also be connected to one or more devices including the authorization computer 110 via a communication network. The user device 102 may also include hardware and/or software capable of receiving user input. The user device 102 may also include a keyboard, touchscreen, microphone, and/or the like for receiving data from a user.

In some embodiments, the user device 102 includes an application for managing interaction requests. The application may be associated with the authorization entity (e.g., a mobile banking application, building access application, or transit access application).

The resource provider computer 104 may be associated with a resource providing entity such as a merchant, service provider, or a secure location. The resource provider computer 104 may receive, transmit, and analyze messages such as authorization request messages, authorization response messages, and interaction request messages such as a request for a value. The resource provider computer 104 may generate settlement requests to request funds for resources provided. The resource provider computer 104 may be connected to the transport computer 106.

The transport computer 106 may be associated with the resource provider computer 104, and may manage requests (e.g., interaction requests and authorization requests) on behalf of the resource provider computer 104. In some embodiments, the transport computer 106 may be operated by an acquirer. In some embodiments, the transport computer may include functionality to transmit and manage a request for a value. Transport computer 106 may be similar to the transport computer 300 described below with respect to FIG. 3.

The processor server computer 108 may include functionality to process an interaction request. An example of a processor server computer 400 is described below with respect to FIG. 4. In some embodiments, the processor server computer 108 is configured to manage requests for value using mappings of value request identifiers to transport computer identifiers, as described herein.

The authorization computer 110 may be a system associated with an issuer or entity (e.g., a bank) that has a business relationship with a processor server computer 108 or other entity. Authorization computer 110 may be similar to the authorization computer 200 described below with respect to FIG. 2. In some embodiments, the authorization computer 110 is configured to send and receive interaction requests to a user device, as well as identify whether a particular interaction should be authorized.

In some embodiments, at step S1, the user device 102 provides information to the resource provider computer 104. The information may be provided to initiate an interaction or series of interactions. As an example, the user device 102 transmits account information to the resource provider computer 104 to set up recurring payments for a monthly subscription service. As another example, the user device 102 transmits information about a guest to a resource provider computer 104 to set up access to a secure location. As another example, the user device 102 transmits account information to the resource provider computer 104 to make an in-store purchase. The user device 102 may transmit the information to the resource provider computer 104 via a message over a network.

In some embodiments, at step S2, the resource provider computer 104 transmits a request for a value to the transport computer 106. The resource provider computer 104 may first prepare the request for the value. For example, the resource provider identifies a value based on goods, services, access to a secure location or file, etc. to be provided to the user of the user device. The resource provider may include in the request for the value the account information or other information provided by the user device at S1. The request for the value may include an account identifier (e.g., a credit card number obtained from the user device at S1). The request for the value may be transmitted from the resource provider computer 104 to the transport computer 106 as a request over a network. In some aspects, the network used at S1 is a first network, and the network used at S2 is a second network (e.g., the user device 102 interacts with the resource provider computer 104 over a short-range wireless network, and the resource provider computer 104 interacts with the transport computer 106 over the Internet).

In some embodiments, at step S3, the transport computer 106 transmits the request for a value to the processor server computer 108. The request for value may be present in an authorization request message such as an 0100 message under ISO 8583. The transport computer 106 may initially receive the request for the value from the resource provider computer and identify the processor server computer 108 to which to route the request for the value. The request for the value may be transmitted from the transport computer 106 to the processor server computer 108 as a request over a network.

In some embodiments, at S4, the processor server computer 108 identifies the appropriate authorization computer 110 and forwards the request for the value to the authorization computer 110. The request for the value may be transmitted from the transport computer 106 to the processor server computer 108 as a request over a network.

In some embodiments, at step S5, the authorization computer 110 transmits an identifier of the request for the value to the processor server computer 108. The identifier of the request for the value may be present in an authorization response message such as an 0110 message under ISO 8583. Unlike a conventional 0110 authorization response message, the authorization response message does not include an authorization or decline code, as this is provided later in the process in step S10. At step S6, the processor server computer 108 identifies the appropriate transport computer 106 and forwards the identifier of the request for the value to the transport computer 106. This indicates to the transport computer 106 that the request for the value is being processed and that an authorization response may not be immediately forthcoming.

In some embodiments, at step S7, the authorization computer 110 transmits a request for approval to the user device 102. The request may, for example, be an alert on an application on the user device 102 of the form "Recurring payment to Movies, Inc. requested. Would you like to pay $7.99 now?". As another example, the request may be an electronic mail (email) message stating "Did you request access to XYZ file?". The user may interact with the user device 102 to approve or decline the request for the value. Upon receiving user feedback, the user device 102 transmits an indication of the user response to the authorization computer 110 at S9. In some aspects, the user need not respond immediately (e.g., the user response may be transmitted/received at S8 a day, week, or month after the user request is transmitted at S7). In some implementations, the authorization computer performs steps S5 and S7 in parallel. Alternatively, or additionally, in some implementations, steps S7 and S8 are performed after or before steps S5 and S6.

In some embodiments, at step S9, the authorization computer 110 determines whether to approve or decline the transaction. For example, the value requested is payment of $100 using a particular credit card. The authorization computer 110 determines whether there is an available balance of at least $100 on the credit card account, whether the credit account is in god standing, and whether the user is authenticated. Upon performing such validation, the authorization computer 110 authorizes the transaction and puts a hold on the credit card account. As another example, the value requested is access to a secure document. The authorization computer 110 validates whether the document is available and whether the user has appropriate permissions to access the document. The authorization computer 110 generates an authorization code indicating approval or declination of the value request.

In some embodiments, at step S10, the authorization computer 110 transmits a message to the processor server computer including the authorization code and the identifier of the request for the value. The processor server computer 108 may use the identifier of the request for the value to identify the appropriate transport computer 106 for receiving the authorization code. The message including the authorization code and the identifier of the request for the value may be an advice message such as an 0120 message under ISO 8583. Unlike a conventional 0120 advice message, the message to the processor server computer including the authorization code and the identifier of the request for the value is used to indicate whether the interaction is approved or declined, which is traditionally included in an 0110 authorization response message. At step S11, the processor server computer 108 transmits the message, comprising the authorization code and the identifier of the request for the value, to the transport computer 106.

In some embodiments, at step S12, the authorization computer 110 transmits a confirmation message to the resource provider computer 104. Based on receiving the confirmation message, the resource provider computer 104 may proceed with completing the interaction at S13. For example, the resource provider computer 104 may provide a good or service to the user subject to receiving an indication of payment. As another example, the resource provider computer 104 may provide access to a secure location or resource to the user subject to receiving an indication that access should be granted.

At step S14, the transport computer 106 may transmit a message to the processor server computer 108 indicating that the authorization code was received. At step S15, the processor server computer 108 may forward the message indicating that the authorization code was received to the authorization computer 110. The message(s) indicating that the authorization code was received may be advice response message(s) such as an 0130 message under ISO 8583.

In some embodiments, clearing and settlement may occur between transport computer 106 and authorization computer 110 at a later time, such as at the end of the day.

Figure 2:
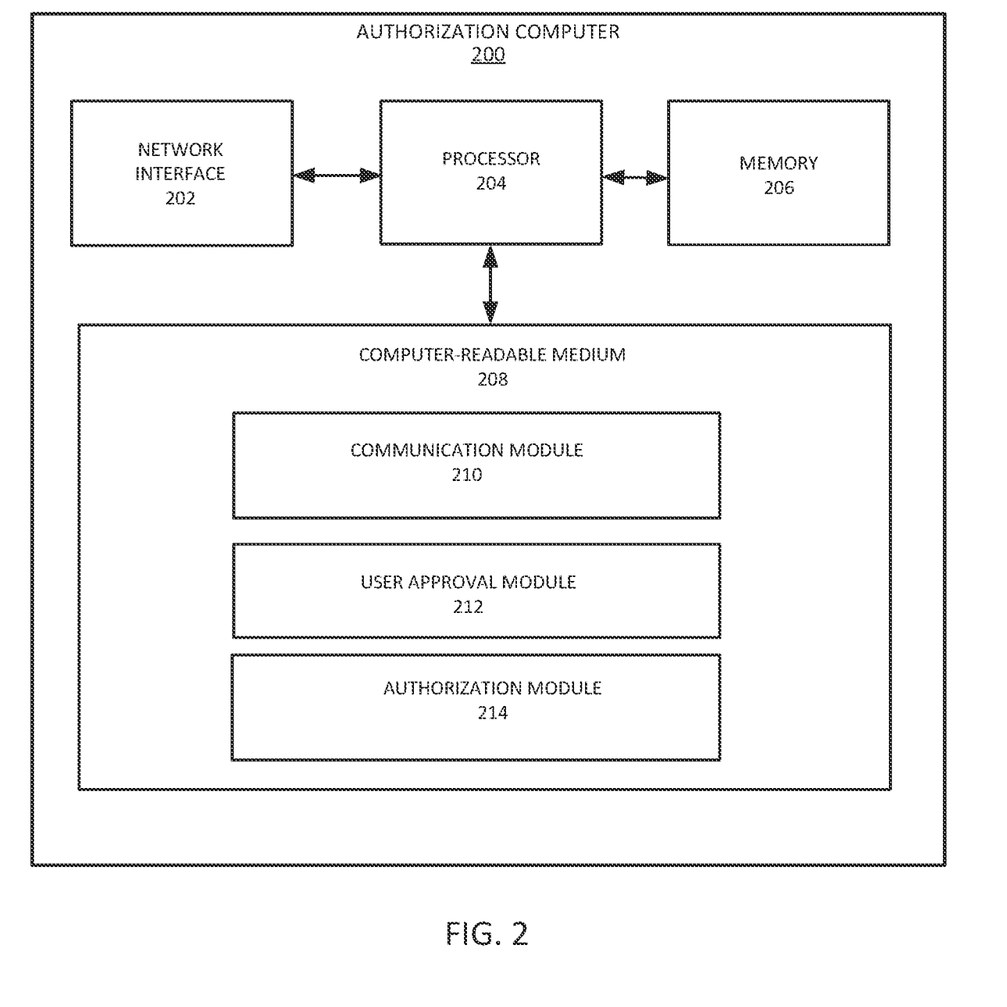
FIG. 2 illustrates an authorization computer, according to some embodiments.

FIG. 2 illustrates an authorization computer 200, according to some embodiments. The authorization computer 200 may be part of the system 100 depicted in FIG. 1 (e.g., authorization computer 110). The authorization computer 200 may include a processor 204 operatively coupled to a memory 206, a network interface 202, and a computer-readable medium 208 (e.g., a non-transitory computer-readable medium). The authorization computer 200 may include more components, or fewer components, than illustrated in this example.

The processor 204 may be implemented as one or more integrated circuits (e.g., one or more single core or multicore microprocessors and/or microcontrollers). The processor 204 may be used to control the operation of the authorization computer 200. The processor 204 can execute a variety of programs in response to program code or computer-readable code stored in memory. The processor 204 may include functionality to maintain multiple concurrently executing programs or processes.

The memory 206 may be implemented using any combination of any number of non-volatile memories (e.g., flash memory) and volatile memories (e.g., DRAM, SRAM), or any other non-transitory storage medium, or a combination of media.

The computer-readable medium 208 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 208 may be any combination of such storage or transmission devices. The computer-readable medium 208 may comprise software code stored as a series of instructions or commands. In some aspects, the code stored by the computer-readable medium 208 includes a communication module 210, a user approval module 212, and an authorization module 214.

In some embodiments, the computer-readable medium 208 includes code for causing the processor 204 to perform a method comprising receiving, by an authorization computer from a transport computer, a request for a value; transmitting, by the authorization computer, the request for the value to a user device for approval; transmitting, by the authorization computer to the transport computer, a message comprising an identifier for the request for the value; receiving, by the authorization computer from the user device, an indication of approval of the request for the value; responsive to receiving the indication of approval from the user device, determining, by the authorization computer, whether or not the value should be granted; and transmitting, by the authorization computer to the transport computer, an authorization code indicating whether or not the value is granted and the identifier for the request for the value.

In some embodiments, the communication module 210 may comprise code that causes the processor 204 to generate messages, forward messages, reformat messages, and/or otherwise communicate with other entities.

In some embodiments, the user approval module 212 includes code that causes the processor 204 to manage requests for user approval. The user approval module 212 may be configured to identify a user device for receiving an interaction request (e.g., a request for a value). The user approval module 212 may further be configured to prepare, send, and receive interaction requests (e.g., a request for a value) to an identified user device.

In some embodiments, the authorization module 214 comprises code that causes the processor 204 to determine whether or not to authorize an interaction. For example, the authorization module 214 may be configured to identify an account and determine whether the account is in good standing and has adequate funds for an interaction. Such an authorization determination may further be based on whether or not user approval has been received for a request for a value.

Figure 3:
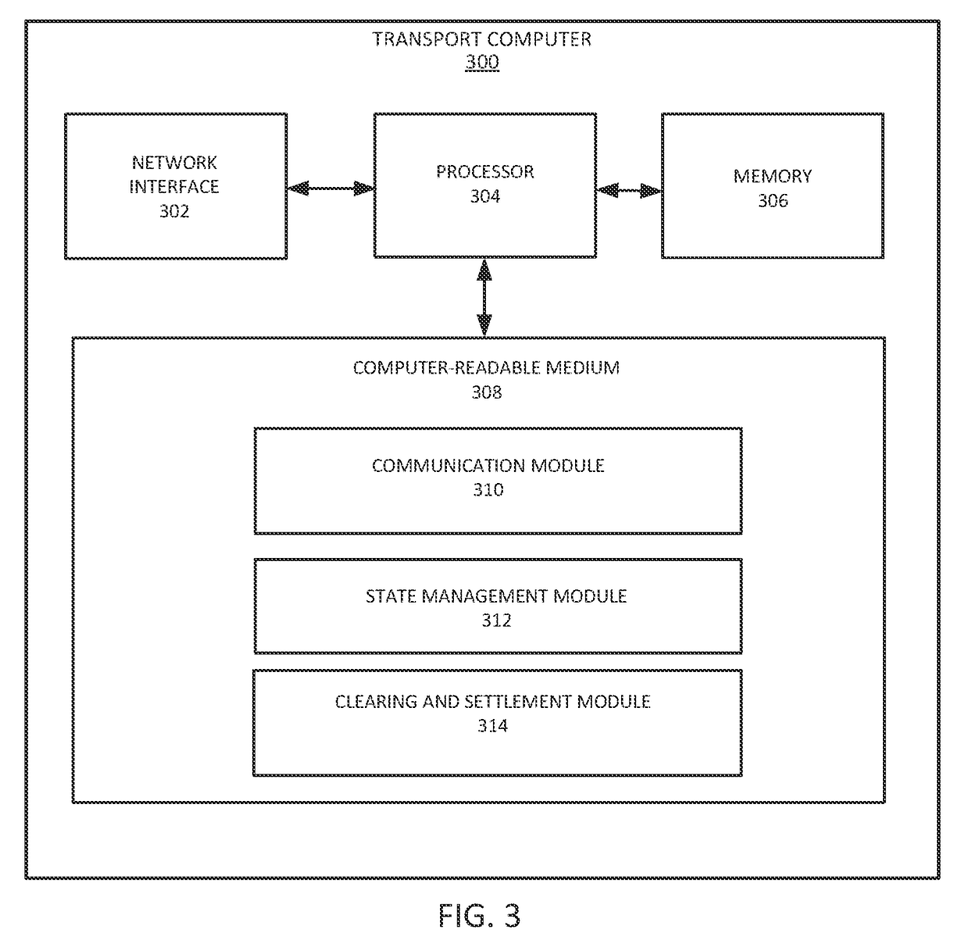
FIG. 3 illustrates a transport computer, according to some embodiments.

FIG. 3 illustrates a transport computer 300, according to some embodiments. The transport computer 300 may be part of the system 100 depicted in FIG. 1 (e.g., transport computer 106). The transport computer 300 may include a processor 304 operatively coupled to a memory 306, a network interface 302, and a computer-readable medium 308. The transport computer 300 may include more components, or fewer components, than illustrated in this example.

The processor 304, memory 306, network interface 302, and computer-readable medium 308 may be similar to the processor 204, memory 206, network interface 202, and computer-readable medium 208 described above with respect to FIG. 2. The computer-readable medium 308 may include a communication module 310, a state management module 312, and a clearing and settlement module 314.

In some embodiments, the computer-readable medium 308 includes code for causing the processor 304 to perform a method comprising receiving, from a resource provider computer, a request for a value; transmitting the request for the value to an authorization computer; receiving, from the authorization computer, a message comprising an identifier for the request for the value; subsequent to receiving the identifier for the request for the value, receiving, by the transport computer from the authorization computer, an authorization code indicating whether or not the value is granted and the identifier for the request for the value; and transmitting, by the transport computer to the resource provider computer, a message indicating whether or not the value is granted.

In some embodiments, the communication module 310 may comprise code that causes the processor 304 to generate messages, forward messages, reformat messages, and/or otherwise communicate with other entities.

In some embodiments, the state management module 312 may comprise code that causes the processor 304 to track different states for an interaction. The state management module 312 may be configured to identify whether an interaction has a pending value request for user approval. If so, the transport computer 300 may extend the time to wait for an authorization response. If not, the transport computer 300 may time out an interaction if an authorization response is not received within a certain threshold time period.

In some embodiments, the clearing and settlement module 314 may comprise code that causes the processor 304 to perform clearing and settlement services. After sending payment confirmation, the clearing and settlement module 314 may comprise code that causes the processor 304 to clear and settle funds between the transport computer and the authorization computer.

Figure 4:
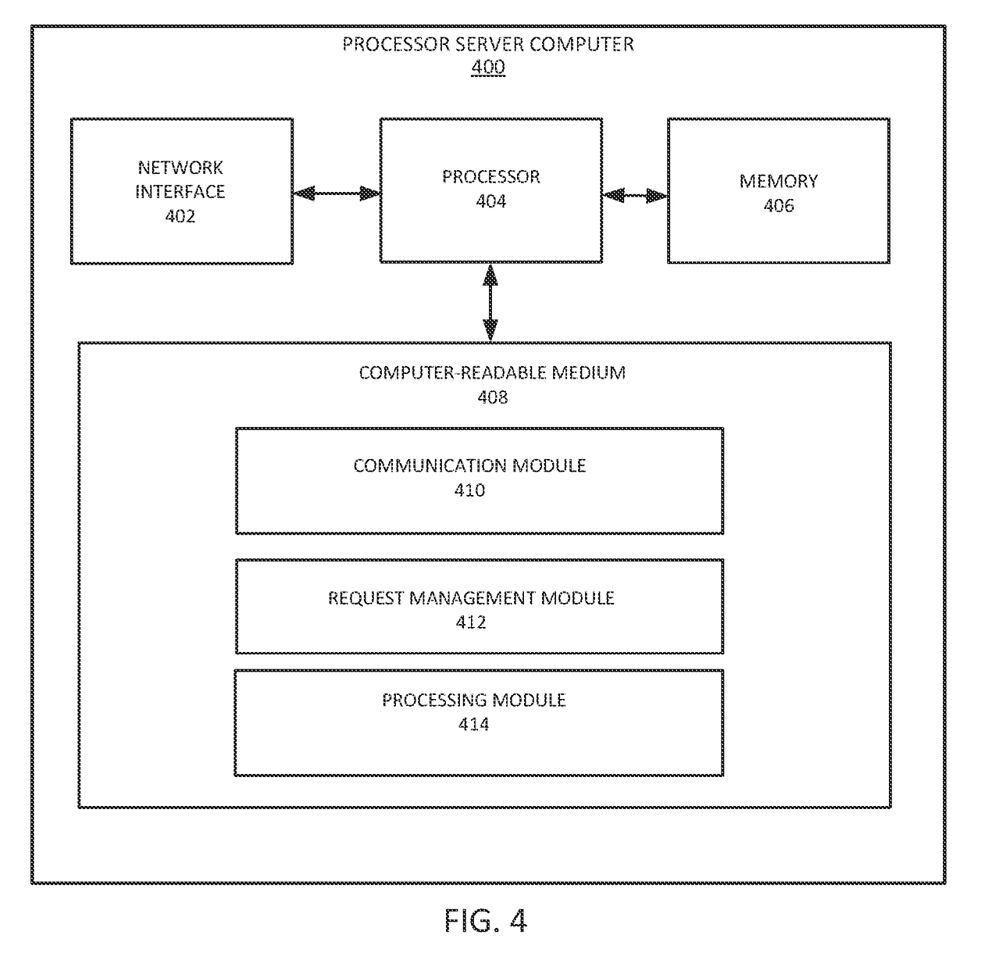
FIG. 4 illustrates a processor server computer, according to some embodiments.

FIG. 4 illustrates a processor server computer 400, according to some embodiments. The processor server computer 400 may be part of the system 100 depicted in FIG. 1 (e.g., processor server computer 108). The processor server computer 400 may include a processor 404 operatively coupled to a memory 406, a network interface 402, and a computer-readable medium 408. The processor server computer 400 may include more components, or fewer components, than illustrated in this example.

The processor 404, memory 406, network interface 402, and computer-readable medium 408 may be similar to the processor 204, memory 206, network interface 202, and computer-readable medium 208 described above with respect to FIG. 2. The computer-readable medium 408 may include a communication module 410, a request management module 412, and a processing module 414.

In some embodiments, the computer-readable medium 408 includes code for causing the processor 404 to perform a method comprising receiving, from a transport computer, a request for a value; transmitting the request for the value to an authorization computer; receiving, from the authorization computer, a message comprising an identifier for the request for the value; transmitting, to the transport computer, the message comprising the identifier for the request for the value; subsequent to receiving the identifier for the request for the value, receiving, from the authorization computer, an authorization code indicating whether or not the value is granted and the identifier for the request for the value; and transmitting, to the transport computer, the authorization code indicating whether or not the value is granted and the identifier for the request for the value.

In some embodiments, the communication module 410 may comprise code that causes the processor 404 to generate messages, forward messages, reformat messages, and/or otherwise communicate with other entities.

In some embodiments, the request management module 412 includes instructions which, when executed by the processor 404, cause performance of operations for tracking different value requests. The processor server computer 400 may receive various different requests for values, which may be pending for different amounts of time subject to user approval. The processor server computer 400 may manage these requests using instructions included in the request management module 412 for storing, indexing, and retrieving information about the various value requests. In some aspects, the request management module 412 is configured to store (e.g., to the memory 406) mappings of value request identifiers to relevant information such as requesting transport computers, user devices and/or users with pending approvals, account identifiers, and so forth.

In some embodiments, the processing module 414 includes instructions which, when executed by the processor 404, cause performance of operations for processing an interaction. The processing module 414 may include code configured to identify appropriate computers for receiving interaction requests and responses. The processing module 414 may include functionality to deliver authorization services, exception file services, and clearing and settlement services.

Figure 5:
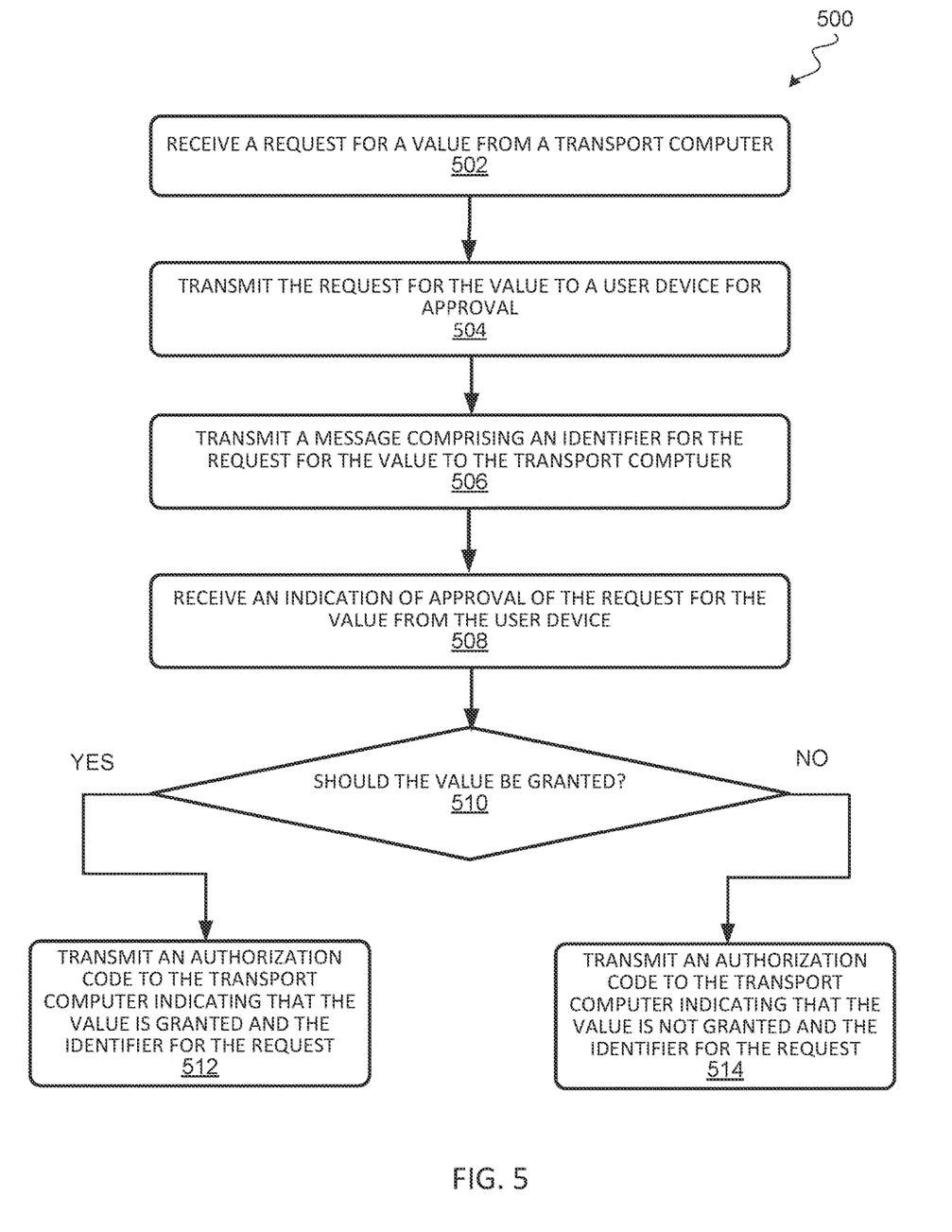
FIG. 5 illustrates an interaction request process as performed by an authorization computer, according to some embodiments.

FIG. 5 illustrates an interaction request method 500 as performed by an authorization computer, according to some embodiments. The method 500 may be performed by the authorization computer 110 in cooperation with other components of the system 100 of FIG. 1. The method 500 presented in FIG. 5 and described below is intended to be illustrative and non-limiting. Although FIG. 5 depicts the various processing steps occurring in a particular sequence or order, this is not intended to be limiting. In certain embodiments, the steps may be performed in different order or some steps may be performed in parallel.

In some embodiments, at block 502, the authorization computer receives a request for a value from the transport computer. The request for the value may include a primary account number associated with a payment card. The request for the value may further include additional information such as an amount associated with the value, a timestamp, and so forth. Alternatively, or additionally, the request for the value may include other information associated with the requested value, such as an identifier of a transit account, employee identifier, or the like.

In some aspects, the authorization computer receives the request for the value from the transport computer via a message received over a network. In some aspects, the message is an ISO message (e.g., an ISO 8583 message type 0100). In some aspects, the authorization computer receives the request for the value directly from the transport computer. Alternatively, or additionally, the transport computer may transmit the request for the value to the processor server computer, which forwards the request for the value to the authorization computer.

In some embodiments, at block 504, the authorization computer transmits the request for the value to the user device for approval. The authorization computer may initially receive the request for the value and parse the request for the value to extract information from the request for the value (e.g., an account number, an amount associated with the value, and so forth). Based on the account number, the authorization computer may identify the user corresponding to the account (e.g., by querying a database and/or look-up table). The authorization computer may transmit the request for the value, for example, to a banking application on the user device, which may cause the banking application to display an interface indicating information about the request for the value and interface elements for accepting an indication of approval or denial for the request for the value. For example, the authorization computer transmits instructions causing the banking application on the user device to display, via a display element of the user device, the text "Monthly subscription charge of $9.99 to Movie World requested," along with interface elements labeled "Approve" and "Deny."

In some embodiments, at block 506, the authorization computer transmits a message comprising an identifier for the request for the value to the transport computer. The authorization computer may transmit the message comprising the identifier for the request for the value to the transport computer over a network. In some implementations, the authorization computer transmits the message comprising the identifier for the request for the value to the processor server computer, which forwards the message to the transport computer. Alternatively, the authorization computer may transmit the message comprising the identifier for the request for the value directly to the transport computer. In some aspects, the message comprising the identifier for the request for the value is an authorization response message (e.g. an ISO 8583 message type 0110).

In some embodiments, the message comprising the identifier for the request for the value is transmitted to the transport computer asynchronously. The authorization computer may transmit the asynchronous message to the transport computer separately from (or without) an authorization result. The asynchronous message does not require a response from the transport computer. In some aspects, the message comprising the identifier for the request for the value indicates to the transport computer that the request for the value is received and pending approval. This enables the transport computer to wait for an authorization response for an extended period rather than canceling the transaction when an authorization response is not received in the usual timeframe.

In some embodiments, at block 508, the authorization computer receives an indication of approval of the request for the value from the user device. The authorization computer may receive the indication of approval of the request for the value as a message from the user device received over a network. For example, the indication of approval is received via a banking application executing on the user device, responsive to user selection of an indication of approval of the request for the value (e.g., by clicking on "approve" or "yes" on a touchscreen).

In some embodiments, at block 510, the authorization computer determines whether the value should be granted. The authorization computer may determine whether the value should be granted by identifying the account associated with the value (e.g., from the indication of approval received at block 508 and/or the original request for the value received at 502). The authorization computer may query a data store associated with the account to make an authorization decision. For example, if the value is payment from a credit or debit account, the authorization computer may analyze account information to determine whether the account is in good standing and has sufficient credit or funds available. As another example, if the value is access to a secure file, the authorization computer may identify and analyze data associated with user permissions to access the secure file.

In some embodiments, at block 512, the authorization computer transmits an authorization code indicating that the value is granted to the transport computer (e.g., to the processor server computer for routing to the transport computer). The authorization computer may transmit, with the authorization code, the identifier for the request for the value. The authorization computer may transmit the authorization code indicating that the value is granted and the identifier to the transport computer responsive to determining that the value should be granted (e.g., "yes" at block 510). The authorization computer may transmit the authorization code and the identifier for the request for the value to the transport computer in a message over a network.

In some aspects, transmitting the authorization code and the identifier comprises transmitting the authorization code and the identifier to the processor server computer, which forwards the authorization code and the identifier to the transport computer. The processor server computer may cross-validate the identifier for the request for the value with that received at block 506, and route the authorization code to the appropriate transport computer. Alternatively, or additionally, the authorization computer may transmit the authorization code and the identifier directly to the transport computer. In some aspects, the message is an ISO message (e.g., ISO 8583 message type 0120).

In some aspects, prior to transmitting the authorization code to the transport computer, the authorization computer and/or the processor server computer identifies the appropriate transport computer for receiving the authorization code. The authorization computer and/or the processor server computer may identify the transport computer for receiving the authorization code using the identifier for the request for the value. For example, the processor server computer queries a stored mapping of identifiers for requests for values and corresponding identifiers of transport computers. Alternatively, or additionally, other information may be extracted from messages and used to identify the appropriate transport computer (e.g., a merchant identifier, transport computer identifier, etc.). Since the authorization code is in this case being pushed to the transport computer rather than sent as a direct response to a standard authorization request, the authorization computer and/or processor server computer may identify which transport computer, of a plurality of potential transport computers, are associated with the authentication code being transmitted.

In some embodiments, at block 514, the authorization computer transmits an authorization code indicating that the value is not granted and the identifier for the request for the value to the transport computer. The authorization computer may transmit the authorization code indicating that the value is not granted and the identifier for the request for the value to the transport computer in a similar fashion as described above with respect to block 512, but the authorization code indicates that the value is not granted and may be in response to determining that the value should not be granted ("no") at block 510.

The transport computer may then transmit the result (e.g., a payment confirmation or other indication of granted access) to the resource provider, which may grant, or refuse, access to a resource based on the result.

In some embodiments, the transport computer, the processor server computer, the authorization computer, and any other suitable device(s) can perform a clearing and settlement process at any suitable time, for example, at the end of a day.

Figure 6:
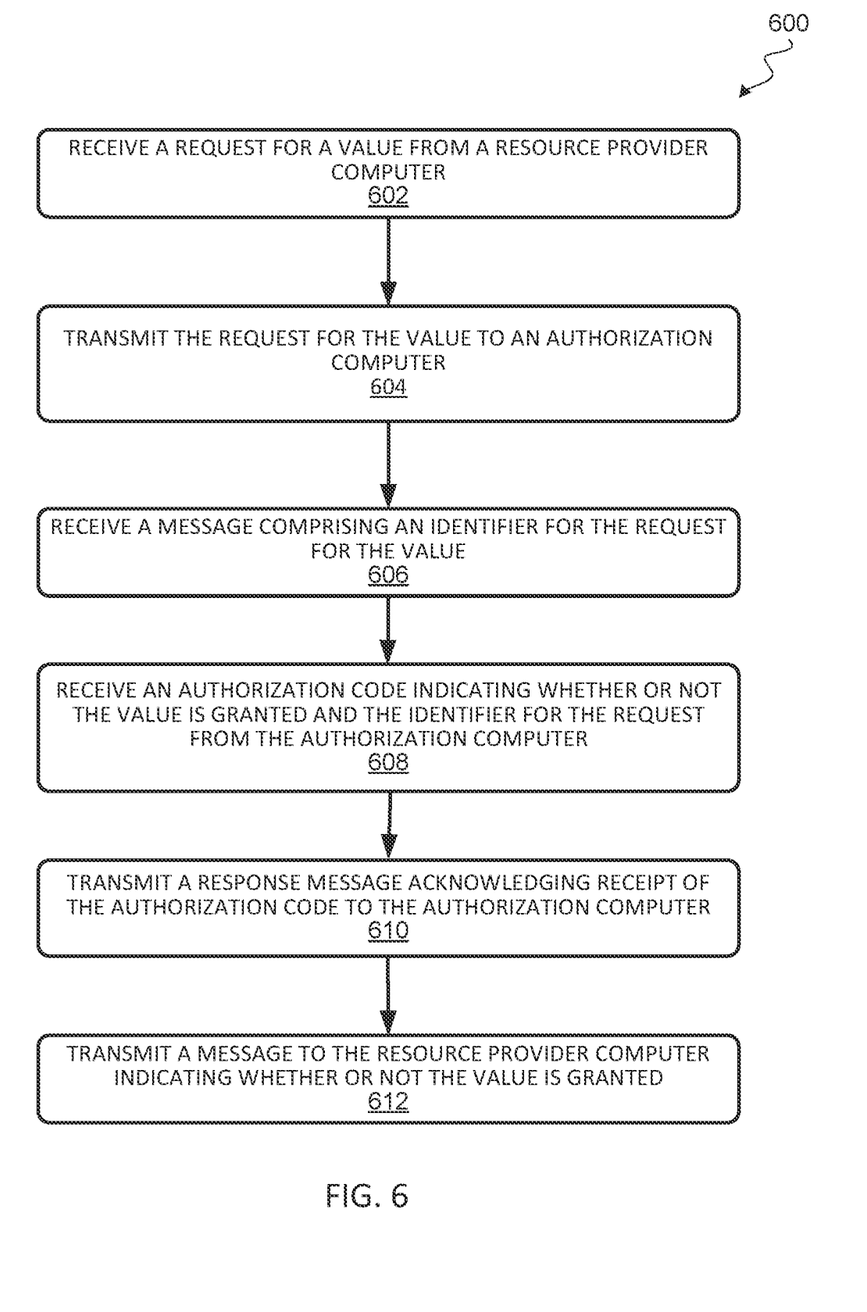
FIG. 6 illustrates an interaction request process as performed by a transport computer, according to some embodiments.

FIG. 6 illustrates an interaction request method 600 as performed by a transport computer, according to some embodiments. The method 600 may be performed by the transport computer 106 in cooperation with other components of the system 100 of FIG. 1. The method 600 presented in FIG. 6 and described below is intended to be illustrative and non-limiting. Although FIG. 6 depicts the various processing steps occurring in a particular sequence or order, this is not intended to be limiting. In certain embodiments, the steps may be performed in different order or some steps may be performed in parallel.

In some embodiments, at block 602, the transport computer receives a request for a value from a resource provider computer. The request for the value may include a primary account number associated with a payment card, an amount associated with the value, a timestamp, an identifier of a transit account, and/or an employee identifier. The transport computer may receive the request for the value from the resource provider computer via a message received over a network. In some aspects, the message is an ISO message (e.g., message type 0100).

In some embodiments, at block 604, the transport computer transmits the request for the value to the authorization computer. The transport computer may transmit the request for the value to the authorization computer in a message over a network. In some aspects, transmitting the request for the value to the authorization computer comprises transmitting the request for the value to the processor server computer, which forwards the request for the value to the authorization computer. Alternatively, or additionally, the transport computer may transmit the authorization code and the identifier directly to the authorization computer. In some aspects, the message is an ISO message (e.g., an ISO 8583 message type 0100).

In some embodiments, at block 606, the transport computer receives a message comprising an identifier for the request for the value. The transport computer may receive the message comprising the identifier for the request for the value from the authorization computer over a network, directly or by way of the processor server computer.

In some aspects, the message comprising the identifier for the request for the value is an asynchronous message. Based on receiving and analyzing the message for the request for the value, the transport computer determines that the request for the value is pending and the transport computer need not time out the interaction.

In some embodiments, based on receiving the message comprising the identifier for the request for value, the transport computer waits an indefinite time for the authorization computer to return an authorization code. Alternatively, or additionally, the transport computer may time out the interaction after not receiving the authorization code within some threshold period of receiving the message comprising the identifier for the request for the value. For example, the transport computer may be configured to time out one or more interactions if the authorization code is not received within 5 hours, 5 days, one month, and so forth. Alternatively, or additionally, if the authorization code is not received in some threshold period, then the transport computer may proceed with the interaction without user approval.

In some embodiments, at block 608, the transport computer receives an authorization code indicating whether or not the value is granted and the identifier for the request for the value from the authorization computer. The transport computer may receive the authorization code in a message over a network from the authorization computer, directly or by way of the processor server computer. For example, the message is an ISO message type 0120.

In some embodiments, at block 610, the transport computer transmits a response message acknowledging receipt of the authorization code to the authorization computer. The transport computer transmits an acknowledgement message indicating receipt of the authorization code to the processor server computer and/or the authorization computer (e.g., an ISO 8583 type 0130 message may be sent to the processor server computer which forwards the ISO 0130 message to the authorization computer).

In some embodiments, at block 612, the transport computer transmits a message to the resource provider computer indicating whether or not the value is granted. In some aspects, the transport computer identifies the appropriate resource provider (e.g., using a merchant identifier in the message received at block 608) and forwards the message received at block 608 to the identified resource provider. Alternatively, or additionally, the transport computer may first modify the message or generate a new message indicating whether or not the value is granted, based on the information received from the authorization computer at block 608.

In some embodiments, the transport computer, the processor server computer, the authorization computer, and any other suitable device(s) can perform a clearing and settlement process at any suitable time, for example, at the end of a day.

The techniques described herein have multiple advantages. Using certain interaction techniques described herein, the transport computer need not monitor for an authorization code and time out the interaction if an authorization code is not received. The transport computer can accordingly reduce the processing required to monitor for an authorization code and manage timeouts. Thus, decoupling the request for the value and the authorization response can streamline the processing performed by the transport computer.

Further, the techniques described herein provide control for the user over an interaction. This reduces the rate of fraud and improves the security of sensitive data related to values stored by the computing devices used herein. For example, typically, for a recurring credit card charge, there is no opportunity for the user to approve, decline, or defer the charge. By using the techniques used herein, the user has the opportunity to approve, decline, or defer each charge, which improves the user experience and significantly reduces chargebacks which are costly and time-consuming. Further, since user approval is conducted on the user device/application (e.g., rather than a website), the likelihood of fraudulent misappropriation is significantly reduced.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

One or more features from any embodiment may be combined with one or more features of any other embodiment without departing from the scope of the invention.

A recitation of "a," "an," or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
receiving, by an authorization computer from a transport computer, a request for a value, wherein the request for the value is an International Organization for Standardization (ISO) message used to allow a user to approve, decline, or defer an interaction before the interaction is processed, and wherein the request for the value comprises a primary account number associated with a payment card;
transmitting, by the authorization computer, the request for the value to a user device for approval;
asynchronously transmitting, by the authorization computer to the transport computer, a message comprising an identifier for the request for the value;
receiving, by the authorization computer from the user device, an indication of approval of the request for the value;
responsive to receiving the indication of approval from the user device, determining, by the authorization computer, whether or not the value should be granted; and
transmitting, by the authorization computer to a processor server computer for routing to the transport computer, an authorization code indicating whether or not the value is granted and the identifier for the request for the value, wherein the processor server computer identifies the transport computer for receiving the authorization code using the identifier for the request for the value.

2. The method of claim 1, wherein receiving the request for the value comprises receiving the request for the value from the processor server computer which forwards the request for the value from the transport computer.

3. The method of claim 2, wherein the processor server computer forwards the authorization code and the identifier for the request for the value to the transport computer.

4. The method of claim 1, wherein the user device interacts with a resource provider computer over a short-range wireless network, and the resource provider computer interacts with the transport computer over the Internet.

5. The method of claim 1, wherein the transmitting the request for the value to the user device for approval comprises causing an alert to be output by an application executing on the user device.

6. The method of claim 1, wherein the indication of approval of the request for the value is transmitted by the user device more than a day after the request for the value is transmitted to the user device.

7. An authorization computer comprising:
a memory;
a processor; and
a non-transitory computer-readable medium comprising instructions, which, when executed by the processor, perform the steps of:
receiving, from a transport computer, a request for a value, wherein the request for the value is an International Organization for Standardization (ISO) message used to allow a user to approve, decline, or defer an interaction before the interaction is processed, and wherein the request for the value comprises a primary account number associated with a payment card;
transmitting the request for the value to a user device for approval;
asynchronously transmitting, to the transport computer, a message comprising an identifier for the request for the value;
receiving, from the user device, an indication of approval of the request for the value; and
responsive to receiving the indication of approval from the user device, transmitting, to a processor server computer for routing to the transport computer, an authorization code indicating whether or not the value is granted and the identifier for the request for the value, wherein the processor server computer identifies the transport computer for receiving the authorization code using the identifier for the request for the value.

8. The authorization computer of claim 7, the steps further comprising: after receiving the indication of approval from the user device, determining whether or not the value should be granted.

9. The authorization computer of claim 7, wherein receiving the request for the value comprises receiving the request for the value from the processor server computer which forwards the request for the value from the transport computer.

10. The authorization computer of claim 9, wherein the processor server computer forwards the authorization code and the identifier for the request for the value to the transport computer.

11. The authorization computer of claim 7, wherein the user device interacts with a resource provider computer over a short-range wireless network, and the resource provider computer interacts with the transport computer over the Internet.

12. The authorization computer of claim 7, wherein the transmitting the request for the value to the user device for approval comprises causing an alert to be output by an application executing on the user device.

13. The authorization computer of claim 7, wherein the indication of approval of the request for the value is transmitted by the user device more than a day after the request for the value is transmitted to the user device.

14. A computer-implemented method comprising:
receiving, by a transport computer from a resource provider computer, a request for a value, wherein the request for the value is an International Organization for Standardization (ISO) message used to allow a user to approve, decline, or defer an interaction before the interaction is processed, wherein the request for the value comprises a primary account number associated with a payment card;
transmitting, by the transport computer, the request for the value to an authorization computer;
asynchronously receiving, by the transport computer from the authorization computer, a message comprising an identifier for the request for the value;
subsequent to receiving the identifier for the request for the value, receiving, by the transport computer from the authorization computer via a processor server computer, an authorization code indicating whether or not the value is granted and the identifier for the request for the value, wherein the processor server computer identifies the transport computer for receiving the authorization code using the identifier for the request for the value; and
transmitting, by the transport computer to the resource provider computer, a message indicating whether or not the value is granted.

15. The method of claim 14, further comprising transmitting, by the transport computer to the authorization computer, a response message acknowledging receipt of the authorization code.

16. The method of claim 14, wherein transmitting the request for the value comprises transmitting the request for the value to the processor server computer which forwards the request for the value to the authorization computer.

17. The method of claim 14, wherein the resource provider computer interacts with the transport computer over the Internet.

18. The method of claim 14, further comprising transmitting the request for the value to a user device for approval, including causing an alert to be output by an application executing on the user device.

19. The method of claim 18, wherein the user device transmits an indication of approval of the request for the value more than a day after the request for the value is received by the user device.

* * * * *